Oct. 12, 1937.    W. F. CREAHAN    2,095,922
DIRECTIONAL CONTROL SIGNAL SWITCH
Filed March 2, 1936
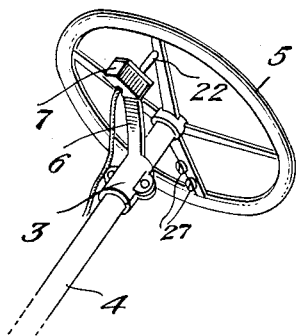
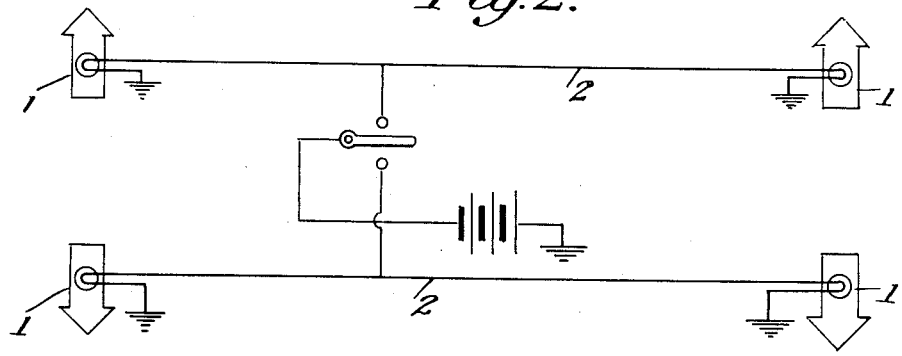
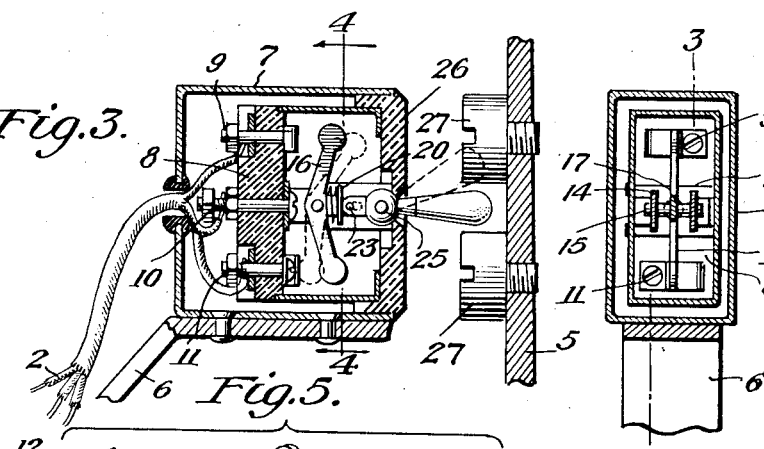
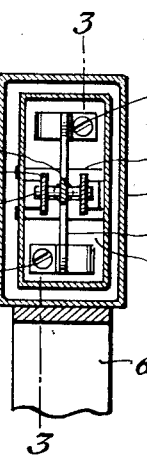
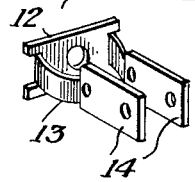
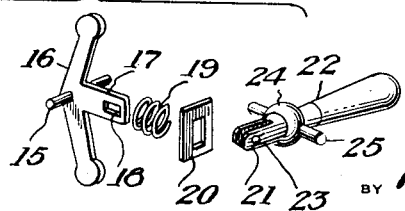
William F. Creahan
INVENTOR
BY Victor J. Evans
ATTORNEY Patented Oct. 12, 1937

2,095,922

UNITED STATES PATENT OFFICE 2,095,922

DIRECTIONAL CONTROL SIGNAL SWITCH

William F. Creahan, Pittsburgh, Pa.

Application March 2, 1936, Serial No. 66,768

1 Claim. (Cl. 200—59)

My present invention has reference to electrically illuminated direction indicators for automobiles or like vehicles and is particularly directed to a switch mechanism for controlling the electric circuit to the signal lamps.

The object is the provision of a switch of a construction to be thrown by hand to illuminate the direction signals on either side of the car and to be thrown to neutral position by the turning of the steering wheel.

For a full and comprehensive understanding of the improvement reference is to be had to the accompanying drawing which is to be read in connection with the following description, the invention being particularly alluded to in the appended claim.

In the drawing:

Figure 1 is a perspective view illustrating the application of the improvement.

Figure 2 is a diagrammatic view of the electric wiring.

Figure 3 is a substantially central longitudinal sectional view through the switch casing illustrating the position of the throw arm of the switch with respect to the button elements on the spoke of the steering wheel.

Figure 4 is a sectional view approximately on the line 4—4 of Figure 3.

Figure 5 is a perspective view of the elements that comprise the main parts of the switch.

As disclosed by the diagram in Figure 2 of the drawing, lamps 1 are arranged at the sides and adjacent to the front and rear of a vehicle (not shown). The wires from the lamps are, of course, grounded, and the circuit wires 2 are connected to a battery and are controlled by the switch that forms the subject matter of this invention.

In carrying out my invention I employ a two part collar 3 which is bolted to the steering column 4 of the steering wheel 5 of an automobile or like vehicle, and one part or element of the collar is formed with an arm extension 6 terminating in an angled end which has bolted or otherwise secured thereto the body or casing 7 of my switch, for disposal below the spokes of the steering wheel as clearly shown in Figure 1.

In the casing 7 there is a block 8 of insulating material, the block having fixed thereto three binding posts 9, 10, and 11. The outer binding posts 9 and 11 have connected thereto, wires of the circuit from the lamps, while the circuit wire from the battery is connected to the inner or central binding post 10. The binding posts are preferably in the nature of screws and the central binding post secures the body portion of a substantially U-shaped bracket 12 to the block 8. The ends of the body portion of the bracket are formed with outwardly extending inwardly arched portions 13 which merge into parallel arms 14. The bracket being of spring metal has an inherent resiliency, and the arched portion 13 has a tendency to force the arms toward each other. Arranged in the arms is a pair of aligned openings disposed adjacent the inner ends thereof, to receive a laterally extending shaft or trunnion 15 that is fixed centrally on an angle throw member 16 which includes diverging portions to present a substantially V-shaped configuration, and centrally formed on the member 16 to project from the juncture of the diverging portions, is an extension 17 having an elongated slot 18 therein.

The extension 17 is in the nature of a finger and has arranged thereon, to contact with the diverging portions, a coil spring 19 which exerts a pressure against a plate 20 that is mounted for slidable movement on the finger 17. The opposite side edges of the plate 20 contact the inner side surfaces of the arms 14, to hold the arms properly spaced.

The outer face of the plate 20 is engaged by either of the flat faces of the cammed or angled end 21 of the bifurcated inner portion of a handle member 22 of the switch, for a purpose which will be later described, and a pivot pin passes through the bifurcated end and the slot or opening 18 in the finger 17, for securing the handle member to the throw member 16 accordingly, for operating the latter in a manner which will be later described.

The handle member 22 has a ball or spherical member 24 formed thereon and which has extending therefrom lateral studs or trunnions 25, to be received in the outer pair of aligned openings in the arms 14 of the bracket 13, and the handle member 22 has a handle portion extending through an outwardly flared opening centrally arranged in the insulated top or closure 26 of the casing 7, with the ball arranged in a curved recess in the closure to act as a bearing, as clearly shown in Figure 3.

From the foregoing, it will be seen that the handle member 22 will be normally held in neutral position as shown in full lines in Figure 3, due to the fact that the spring influenced plate 20 contacts the center face of the cammed end 21 thereof. However, the handle member 22 may be manually swung upon its trunnions 25 to swing either of the diverging portions or angle ends of the throw member 16 against their contacts on the binding posts 9 or 11 and thereby illuminate the lamps on either side of the vehicle, the member 16 being held accordingly by the outer faces of the cammed end, as will be apparent.

To automatically return the switch to neutral position, I fix on one of the arms of the steering wheel, two spaced buttons which are in the nature of headed screw bolts 27, and either of these screw bolts will be arranged in the path of the handle 22 when the latter has been moved to either of its operative positions, one being shown in dotted lines in Figure 3, to move the same to neutral position as shown in full lines, so that the switch is operated accordingly without manual operation, other than the turning of the steering wheel. It will be obvious that the buttons can be secured to any spoke, and that one button can be secured to one spoke and the other button to another.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A switch for directional signalling devices for motor vehicles, comprising a casing, a block of insulating material therein, a central and a pair of outer contact bearing binding posts secured to the block, a substantially U-shaped bracket mounted on the central binding post and including arched portions having spaced parallel spring arms extending therefrom, said arms provided with pairs of aligned openings therein, a toggle member journaled in one pair of openings for disposal between the arms and including diverging portions arranged to have their outer ends engage the contacts of the outer binding posts, a finger extending from the juncture of the diverging portions, a spring pressed plate slidably mounted on the finger, a handle member journaled in the other pair of openings and extending through the casing, a bifurcated cammed inner end for the handle member engageable with the plate and pivoted to the finger with the latter disposed between the bifurcations thereof, said handle member being manually moved for disposing the switch into operative position, and steering wheel carried means engageable with the handle member for disposing the switch from operative to neutral position.

WILLIAM F. CREAHAN.